United States Patent [19]

Nishimura et al.

[11] Patent Number: 5,592,817
[45] Date of Patent: Jan. 14, 1997

[54] FORKLIFT CONTROLLER

[75] Inventors: Ryuhei Nishimura; Hiroaki Murakami; Shinya Yamamura, all of Kyoto, Japan

[73] Assignee: Shimadzu Corporation, Kyoto, Japan

[21] Appl. No.: 601,540

[22] Filed: Feb. 14, 1996

Related U.S. Application Data

[63] Continuation of Ser. No. 234,104, Apr. 26, 1994, abandoned.

[30] Foreign Application Priority Data

| Apr. 27, 1993 | [JP] | Japan | 5-100764 |
| Apr. 28, 1993 | [JP] | Japan | 5-102827 |

[51] Int. Cl.⁶ ............................ B60K 23/00; F16D 31/02
[52] U.S. Cl. .................... 60/431; 60/448; 60/488
[58] Field of Search .................. 60/428, 431, 426, 60/427, 448, 449, 487, 486, 488, 490

[56] References Cited

U.S. PATENT DOCUMENTS

| 3,952,515 | 4/1976 | Habiger et al. | 60/488 X |
| 4,033,127 | 7/1977 | Amstutz et al. | 60/486 X |
| 4,050,248 | 9/1977 | Hachmann | 60/486 X |
| 4,368,798 | 1/1983 | Meyerle et al. | 60/448 X |
| 4,459,806 | 7/1984 | Falk | 60/431 X |
| 4,596,118 | 6/1986 | Heiser | 60/431 |
| 4,648,040 | 3/1987 | Cornell et al. | 60/395 X |
| 4,727,490 | 2/1988 | Narita et al. | 60/431 X |
| 4,864,823 | 9/1989 | Ikejiri et al. | 60/488 |
| 5,050,379 | 9/1991 | Nagai et al. | 60/422 X |
| 5,092,153 | 3/1992 | Ikari | 60/449 X |
| 5,203,168 | 4/1993 | Oshina et al. | 60/488 X |
| 5,214,916 | 6/1993 | Lukich | 60/431 |
| 5,323,611 | 6/1994 | Kotake | 60/449 |

FOREIGN PATENT DOCUMENTS

3508155A1  9/1985  Germany.

*Primary Examiner*—John E. Ryznic
*Attorney, Agent, or Firm*—Nikado Marmelstein Murray & Oram LLP

[57] ABSTRACT

The forklift controller changes the speed of the actuator, corresponding to the operational angle of the lift lever, and then changes the vehicle speed, corresponding to the amount of depression of an accelerator. This allows the controller to control the throttle opening corresponding to the operational angle of the lift lever, and together controls the amount of depression of the accelerator. During running without being loaded, the forklift controller changes the vehicle speed, corresponding to the amount of depression of the accelerator, and together determines the number of revolutions of the engine to the throttle opening so that the optimum fuel consumption can be obtained. The controller controls the throttle opening and speed ratio so that the vehicle speed and number of revolutions of the engine can be controlled.

13 Claims, 12 Drawing Sheets

2

FORKLIFT CONTROLLER

This application is a continuation of application Ser. No. 08/234,104 filed Apr. 26, 1994, now abandoned.

FIELD OF THE INVENTION

The present invention is related to a forklift controller for improving the operation ability and loading-ability of the forklift, and simultaneously improving vehicle speed control and optimum fuel consumption of the forklift.

BACKGROUND OF THE INVENTION

The ordinary example of the conventional forklift controller has a configuration wherein the output shaft of the engine and the wheel are connected via a stagged transmission having a sliding factor. A loading driving actuator of the lift cylinder is connected to the output shaft of the engine via a fixed pump. In addition, this controller is equipped with an accelerator pedal directly connected to the throttle valve of the engine and a clutch pedal (for a forklift truck with an automatic transmission, this is referred to as an inching pedal) as an interconnection means of the wheel to the output shaft of the engine through operation of the sliding factor, thus adjusting the vehicle speed and loading speed via these two (2) pedals. Specifically, only during a loading operation in a stopped position, the loading speed is adjusted by an amount of depression of the accelerator pedal when the clutch is released. Also, the vehicle speed is adjusted by the amount of depression of the accelerator pedal only when running/moving after the loading operation at a stopped position when the clutch pedal is connected.

However, with this type of forklift, in many cases, the vehicle body is moving at a desirable speed when the lift is elevated, that is, moving while loaded. The forklift equipped with the conventional controller adjusts both the vehicle speed and loading speed through the stepping action (depression) on the accelerator pedal. Thus, it is impossible to independently operate only the vehicle speed or number of revolutions of the engine. Therefore, an operator has no method to get a desirable vehicle speed and loading speed other than searching for a balanced point of both speeds of the accelerator and clutch through simultaneous operation thereof. Thus, the conventional forklift has problems because operation for proper loading while running is difficult and a higher level of skill is required for the operator.

Some conventional forklifts wherein the vehicle speed control had been controlled from the standpoint of improvement of the operation ability have been known. However, no forklifts wherein the fuel consumption factor had been considered existed. That is, in the conventional forklift as mentioned above, the target value of the vehicle speed is set depending on the amount of depression of the accelerator pedal. The accelerator is depressed and then its operating amount is conveyed to the throttle valve via wires. Thus, immediately after the throttle valve is closed and the engine is accelerated, only the speed ratio of the transmission is changed upward to the motive power transmission status where the vehicle speed obtains a target value to the number of revolutions of the engine. Therefore, the number of revolutions of the engine increases as the opening of the throttle increases. However, one of the engine characteristics is that the target number of revolutions of the engine also has an optimum fuel consumption for the throttle opening. The conventional forklift has a problem that as the number of revolutions of the engine actually increases, and thus changes with no relation to the optimum fuel consumption conditions, the fuel consumption rate worsens and a great deal of loss occurs during full operation.

SUMMARY OF THE INVENTION

In consideration of the above-mentioned matter, the main object of the present invention is to provide a forklift controller which can efficiently improve the operational-ability of the forklift during running while loaded.

Another object of the present invention is to provide a forklift controller which enables operating at the optimum fuel consumption rate during vehicle speed control of the forklift.

The summary of the present invention is that the forklift controller is equipped with a hydrodynamic transmission for changing the speed ratio infinitely while intervening between the engine and wheel. A loading operational device for operations while loaded at a loading speed depending on the number of revolutions of the engine. The engine is driven by engine motive power. A loading speed detecting device detects the loading speed. A loading speed setting device sets the target value of the loading speed. A vehicle speed detecting device detects the vehicle speed of the forklift. A vehicle speed setting device sets the target value of the vehicle speed. A throttle opening controlling device controls the throttle opening of the engine so that the loading speed detected by the loading speed detecting device is maintained at the target value set by the loading speed setting device. A speed ratio controlling device controls the speed ratio of the hydrodynamic transmission so that the vehicle speed detected by the loading speed detecting device is maintained at the target value set by the vehicle speed setting device.

Preferably the forklift controller is equipped with a hydrodynamic transmission for changing the speed ratio infinitely while intervening between the engine and wheel. A vehicle speed detecting device detects the vehicle speed. A vehicle speed setting device sets the target value of the vehicle speed. A number of revolutions of the engine detecting device detects the number of revolutions of the engine. A throttle opening detecting device detects the throttle opening of the engine. A number of revolutions of the engine setting device sets the target number of revolutions of the engine meeting the optimum fuel consumption condition to the throttle opening detected by the throttle opening detecting device. A throttle opening controlling device controls the throttle opening of the engine so that the number of revolutions of the engine detected by the number of revolutions of the engine detecting device is maintained at the target value set by the number of revolutions of the engine. A speed ratio controlling device controls the speed ratio of the hydrodynamic transmission so that the vehicle speed detected by the vehicle speed detecting device is maintained at the target value set by the vehicle speed setting device.

If the controller is applied to a forklift in order to control the loading speed to the target value corresponding to the operational amount of the loading speed setting device, and then control the vehicle speed to the target value corresponding to the amount of depression of the accelerator configuring the vehicle speed setting device, an operator can control the loading speed only with the lift lever configuring the loading speed setting device and control the vehicle speed only with the accelerator, resulting in greater improvement of the operation ability of the forklift during running while loaded, compared with the conventional forklift controller.

Optimum vehicle speed control corresponding to the accelerator opening and number of revolutions of the engine control meeting the optimum fuel consumption conditions corresponding to the throttle opening can be simultaneously executed, resulting in greater improvement of fuel consumption during running in comparison with the conventional forklift controller, as well as improvement of the speed operation ability of the forklift.

DETAILED DESCRIPTION OF THE PREFERRED EMBODIMENTS

The following are the preferred embodiments of the present invention described with reference to the drawings.

Figure 1A:
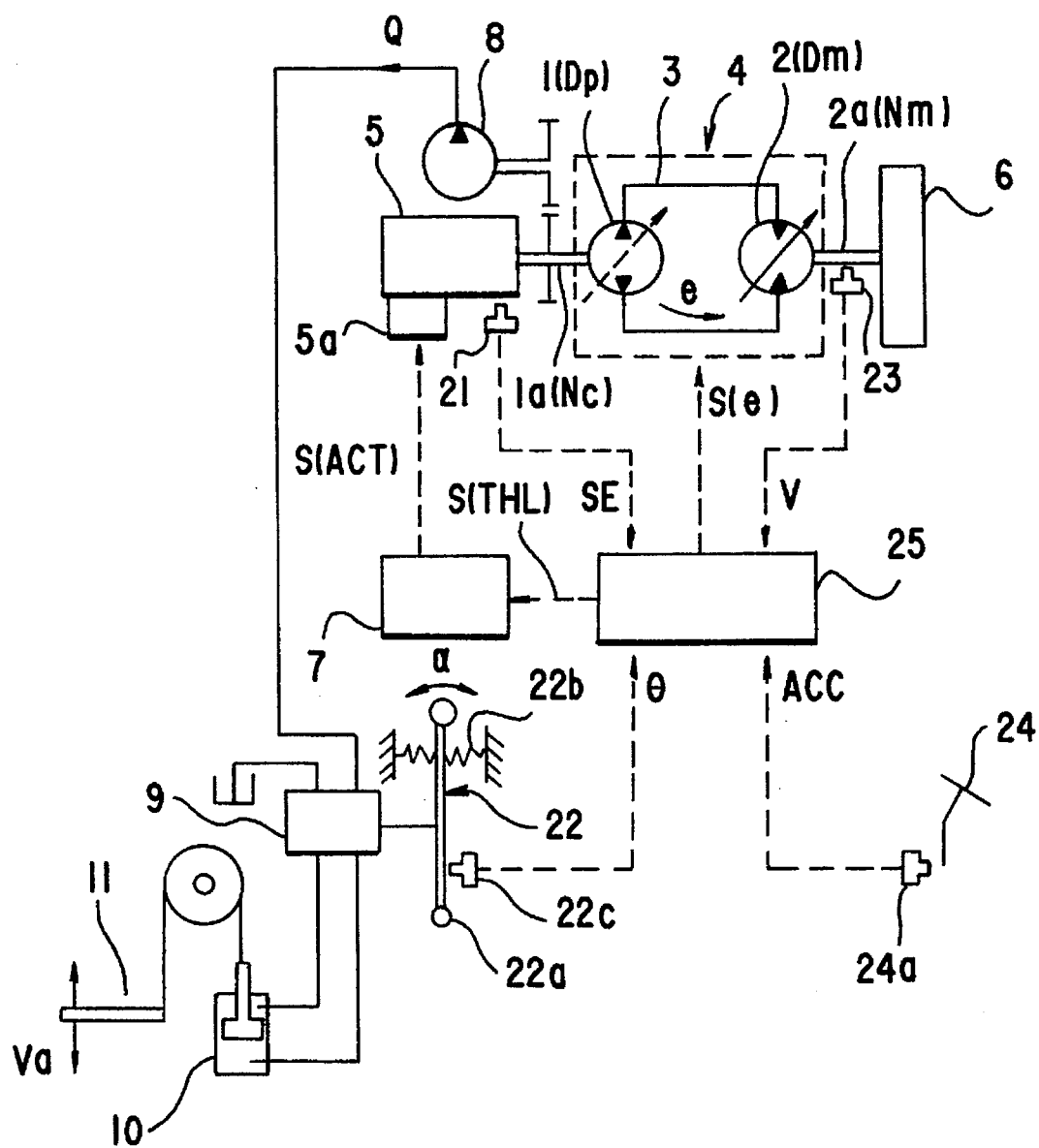
FIGS.1A–1B are schematic block diagrams illustrating the first preferred embodiment of the present invention.
Figure 2:
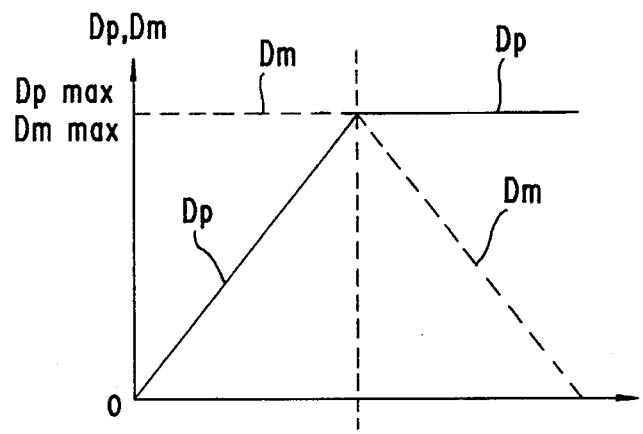
FIG.2 is a graph for illustrating the HST action in FIG.1.
Figure 3:
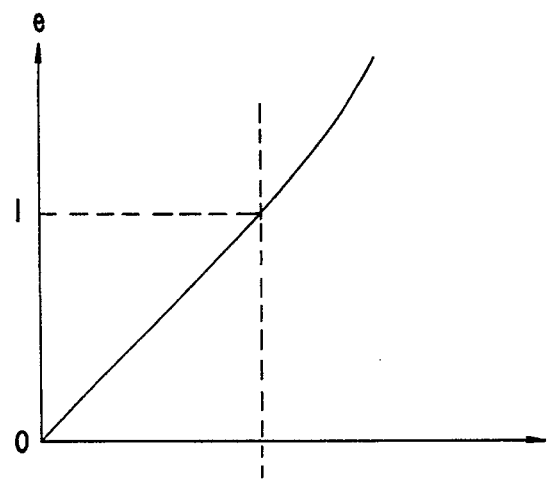
FIG.3 is a graph illustrating a change of the speed ratio corresponding to FIG.2.

The forklift whereto the controller corresponding to the first preferred embodiment of the present invention is applied, as shown in FIG.1A, connects the input shaft $1a$ of the pump to the engine 5. The motor output shaft $2a$ of the motor is connected to the wheel 6, using the stepless transmission 4 referred to as HST. The HST combines the variable displacement pump 1 and variable capacity motor 2 using the hydraulic circuit 3. The engine 5 is equipped with a throttle valve control actuator $5a$. When an actuator driving signal S(ACT) is provided from the fuel injection system controller 7 to the actuator $5a$, this actuator $5a$ drives the throttle valve (not illustrated in the figure) to achieve the required throttle opening THL. On the other hand, if HST 4 makes the capacity of the pump 1 Dp, the number of revolutions of the pump input shaft $1a$ Np, the capacity of the motor 2 Dm and the number of revolutions of the motor output shaft $2a$ Nm, assuming that the maximum displacement–Dp max. and Dm max. are mutually equal, and additionally assuming that the hydraulic circuit 3 has no leak, the relationship of Dp×Np=Dm×Nm is established and the speed ratio is expressed as e=Nm/Np=Dp/Dm. This speed ratio can be adjusted infinitely by changing the pump displacement Dp or motor capacity Dm. That is, as shown in FIG.2, HST 4 has a characteristic that initially changing the pump displacement Dp from zero (0) to the maximum of Dp while maintaining the motor capacity Dm at the maximum of Dm, causes the speed ratio e to vary in the range of $0 \leq e \leq 1$, as shown in FIG.3. Additionally, changing the pump displacement Dm from the maximum of Dm to zero (0) while maintaining the pump displacement Dp at the maximum of Dp, causes the speed ratio e to vary in the range of $1 \leq e$. Discharged oil is supplied to the lift cylinder 10–an actuator, via the directional control valve 9 by connecting the fixed pump 8 to the pump input shaft $1a$ via the gears, and then driving this fixed pump 8 with the motive power of the engine 5. In this case, as the discharge flow Q of the fixed pump 8 is schematically proportional to the number of revolutions of the variable displacement pump–Dp, and in turn it is schematically proportional to the number of revolutions of the engine–SE, the lift cylinder 10 operates at the speed Va corresponding to the number of revolutions of the engine–SE, thus thereby elevating the lift 11.

In the forklift as mentioned above, the controller, the first embodiment of the present invention, is equipped with 1) a detecting means 21 of the number of revolutions of the engine–the loading speed detecting means; 2) a vehicle speed detecting means 23 for detecting the vehicle speed; 3) a loading speed setting means comprising a lift lever 22, and an angle detecting means $22c$; and 4) a controller 25 which functions as the throttle opening controlling means and speed ratio controlling means.

In more detail, the detecting means 21 of the number of revolutions of the engine is an encoder mounted on the crankshaft of the engine 5 or the pump input shaft $1a$. It detects the number of revolutions of the engine–SE, converts the number of revolutions–SE into an electric signal and then outputs it. The fixed pump 8 discharges the oil of the flow Q proportional to SE×Dr, if the pump displacement is Dr. The loading speed Va of the lift cylinder 10 driven by the oil becomes proportional to the number of revolutions of the engine–SE. Therefore, in this embodiment, the number of revolutions of the engine–SE is detected instead of the loading speed Va.

Figure 4:
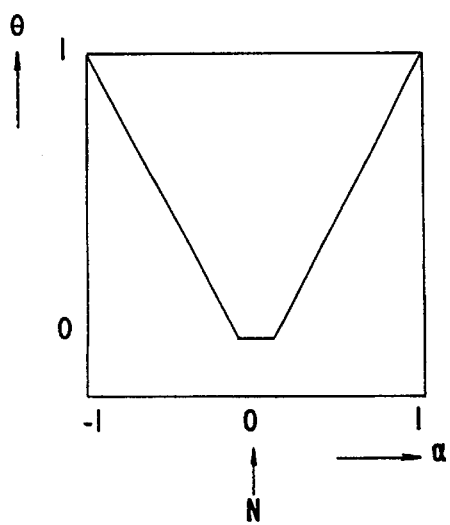
FIG.4 is a graph illustrating the relationship between the tilting angle θ of the lift lever and the detection angle θ in the first preferred embodiment of the present invention.

The lift lever 22 is equipped with an offsetting spring $22b$, which is capable of being tilted around the rotary supporting point and used for automatic return thereof to the neutral position N, and an angle detection means $22c$ such as a potentiometer for detecting the tilting angle α produced by the lift lever 22's forward-backward tilting depending on the direction of the work with reference to the neutral position N. The controller 25 inputs the detection angle θ corresponding to the tilting angle α and determines the number of revolutions of the engine–SE0 corresponding to the target value Va0 of the loading speed by the pre-specified map or operation expression. This lift lever 22, being connected to one end of the directional control valve 9, changes-over the directional control valve 9 in interlocking with the operation of the lift lever 22, thus thereby causing the fixed pump 8 to communicate with one or another pressure rooms of the lift cylinder 10. The relationship between the tilting angle α and detection angle θ is, in what is called a play-dead zone, mounted in the vicinity of the neutral position N as shown in FIG.4, and the detection angle θ is output linearly to the tilting angle α exceeding the play-dead zone. The vehicle speed detecting means 23 is the encoder mounted in addition to the vehicle shaft, that is the motor output shaft 2a. It converts the vehicle speed V corresponding to the number of revolutions of the shaft 2a–Nm into an electric signal and then outputs it.

The accelerator 24 is not combined with the throttle valve in the engine 5, and the amount of depression of the accelerator–ACC is converted into an electric signal by the means 24a for detecting the amount of depression of the accelerator and then it is output. The controller 25 inputs the amount of depression–ACC and determines the target value V0 of the vehicle speed corresponding to the amount of depression–ACC by the prespecified map or operation expression. The means 24a for detecting the amount of depression on the accelerator, for example, can be achieved by mounting the rotary potentiometer on the rotation shaft of the accelerator 24.

Figure 5:
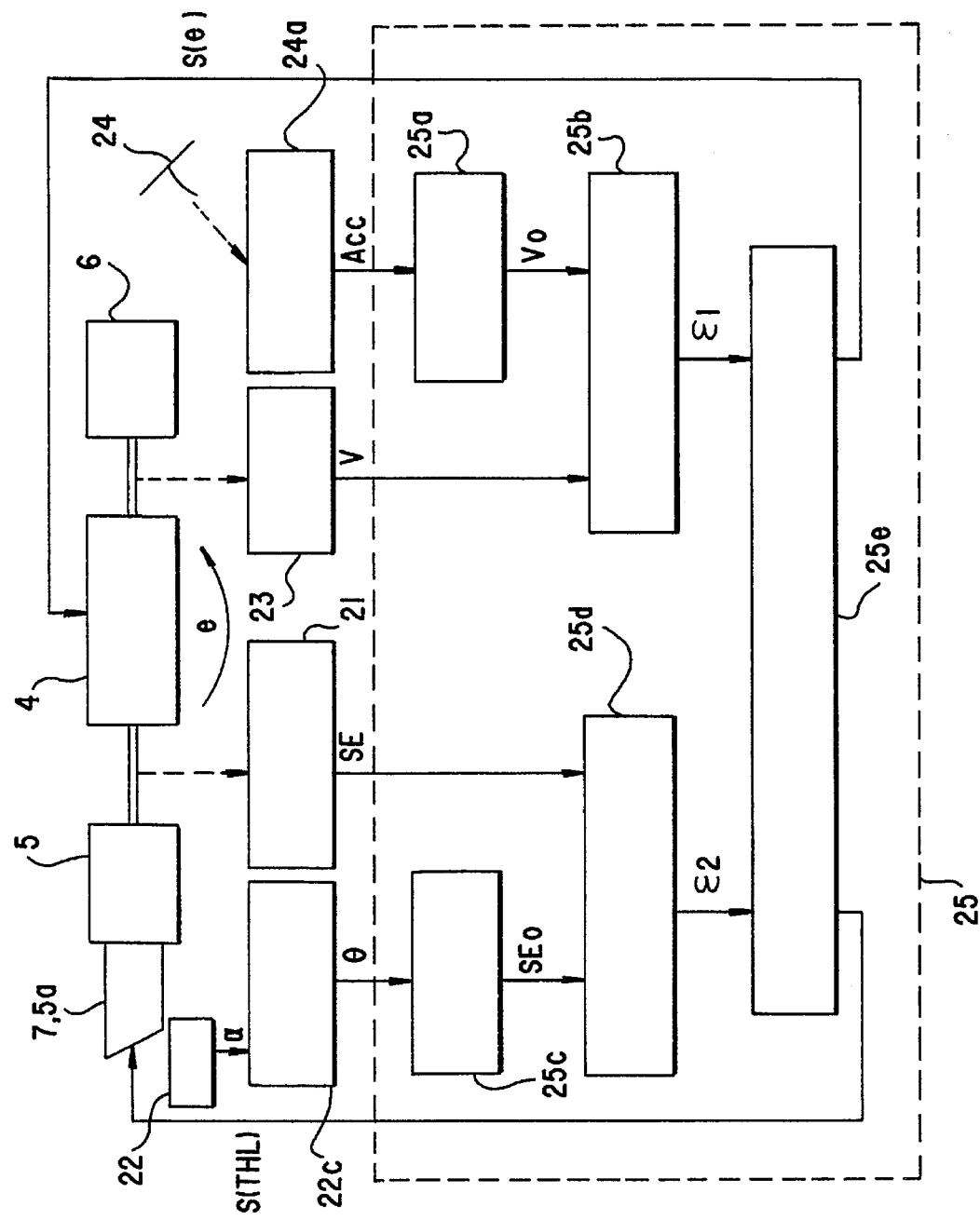
FIG.5 is a configurational explanatory drawing of the first preferred embodiment of the present invention.

The controller 25 comprises an ordinary microcomputer system equipped with, for example, a CPU, memory, interface, etc. The controller 25 inputs the number of revolutions of the engine–SE, detection angle θ, vehicle speed V and amount of depression of the accelerator–ACC, and executes the integrated program, and then it outputs the necessary control signal to the HST 4 and the controller 7 of the fuel injection system. FIG.5 is a block diagram of the first preferred embodiment of the above-mentioned present invention and the section enclosed by dotted lines is a block diagram of the function of the controller 25. In FIG.5, 25a is a means for determining the vehicle speed. It inputs the amount of depression of the accelerator–ACC from the means 24a for detecting the amount of depression of the accelerator, and then determines the target value, V0 of the vehicle speed corresponding to the amount of depression–ACC by a map or operation expression in which the target value V0 of the vehicle speed considered optimum to the input amount of depression on the accelerator–ACC has been determined. Specifically, in the map, for example, the setting for a linear correspondence of the amount of depression of the accelerator–ACC and the target value V0 of the vehicle speed has been made. 25b is the first comparison unit. It compares the target value V0 of the vehicle speed specified by the vehicle speed determining means 25a with the actual vehicle speed V detected by the vehicle speed detecting means 23, and then outputs the deviation ε1 to the operation means 25e. On the other hand, 25c is a means for determining the number of revolutions of the engine, inputs the detection angle θ corresponding to the tilting angle α of the lift lever 22 and then determines the target value, SE0 of the number of revolutions of the engine corresponding to the target value Va0 of the loading speed by the prespecified map or operation expression. 25d is the second comparison unit. It compares the target value SE0 of the number of revolutions of the engine specified by the means 25c for determining the number of revolutions of the engine with the actual number of revolutions of the engine–SE detected by the means 21 for detecting the number of revolutions of the engine, and outputs the deviation thereof ε2 to the operation means 25e. The operation means 25e outputs the control signal S(e) to HST 4 so that the deviation ε1 becomes zero (0), and it outputs the control signal S(THL) so that the deviation ε2 becomes zero(0), thereby controlling the throttle valve.

Figure 6:
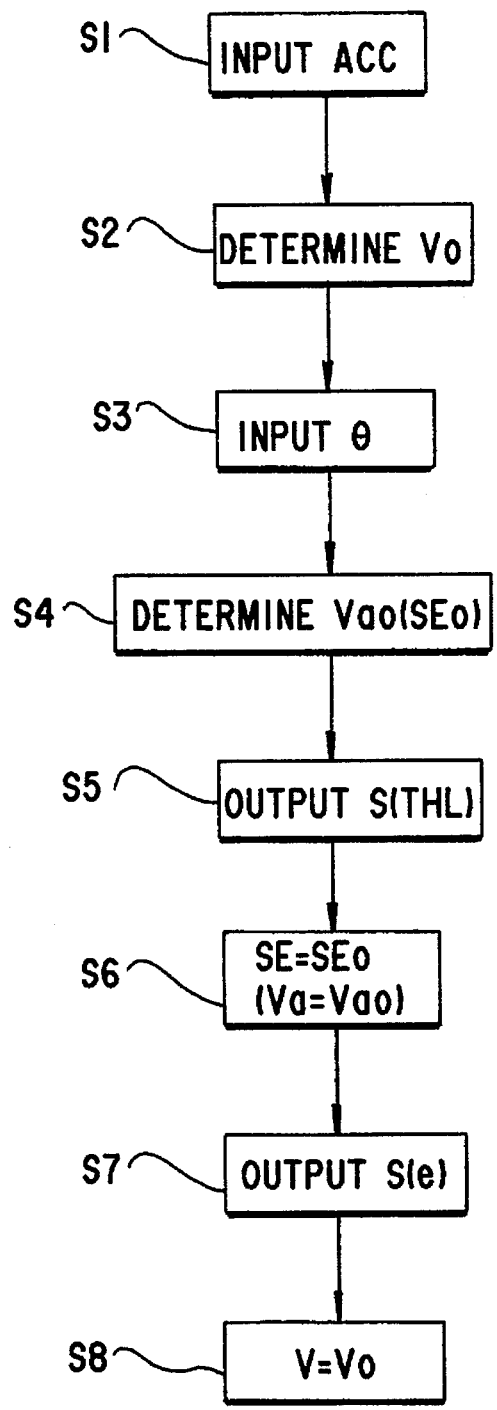
FIG.6 is a flow chart illustrating the control outline to be executed by the controller, of the first preferred embodiment of the present invention.

FIG.6 is a flow chart illustrating the outline of the program. The following are the description of the operation of the controller 25 according to this flow chart.

Figure 7:
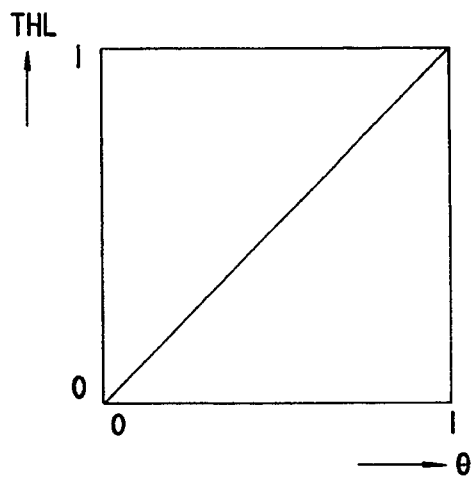
FIG.7 is a graph illustrating the relationship between the detection angle θ and the output THL of the throttle valve control actuator in the first preferred embodiment of the present invention.
Figure 8:
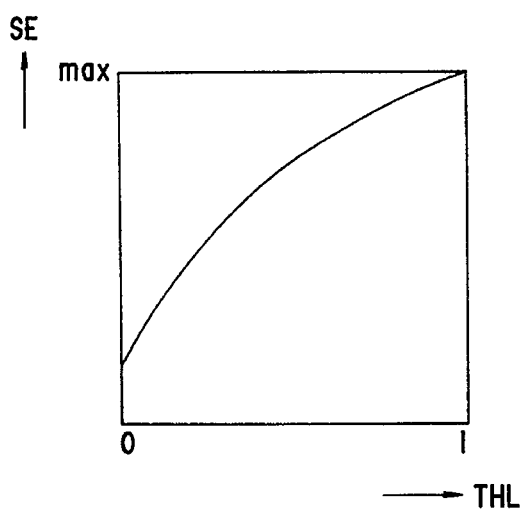
FIG.8 is a graph illustrating the relationship between the throttle opening THL and the target number of revolutions of the engine–SE in the first preferred embodiment of the present invention.
Figure 9:
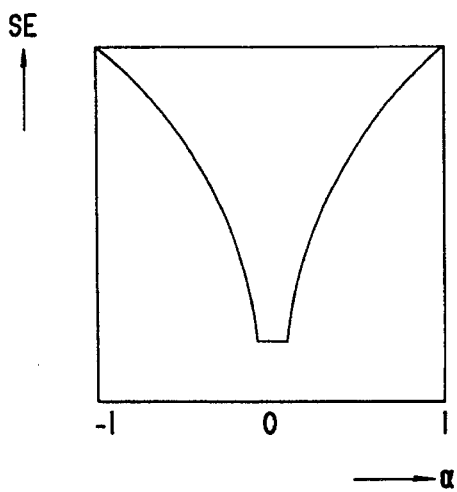
FIG.9 is a graph illustrating the relationship between the tilting angle α of the lift lever and the target number of revolutions of the engine–SE in the first preferred embodiment of the present invention.

This program runs per prescribed gate time and then executes the command. Initially when the operator is depressing on the accelerator 24, the means 25a for determining the vehicle speed of the controller 25 inputs the amount of depression–ACC at step S1 and then determines the target value V0 of the vehicle speed corresponding to the amount of depression–ACC at step S2. When the operator is operating the lift lever 22, the means 25C for determining the number of revolutions of the engine of the controller 25 inputs the detection angle θ corresponding to the tilting angle α, at step S4, determines the target value, Va0, of the loading speed corresponding to the tilting angle θ at step S3 and then converts it into the target value SE0 of the number of revolutions of the engine. The second comparison unit 25d of the controller 25 outputs the deviation ε2 while comparing the number of revolutions of the engine–SE input from the means 21 for detecting the number of revolutions of the engine with the target value, SE0. If the number of revolutions of the engine–SE is greater than the target value SE0 on the basis of the deviation ε2, the operation means 25e outputs the control signal S(THL) for decreasing the throttle opening THL to the controller 7 of the fuel injection system. If SE is lower than the target value SE0, the operation means outputs the control signal S(THL) for increasing the throttle opening THL to the controller 7 of the fuel injection system. Thus, the necessary actuator control signal S(ACT) is output from the controller 7 of the fuel injection system to the engine 5. FIG.7 shows the relationship between the prespecified detection angle θ and target throttle opening THL, and FIG.8 shows the relationship between the throttle opening degree THL controlled by the controller and the number of revolutions of the engine–SE (however, in a non-loaded state). This causes the number of revolutions of the engine –SE to vary to the tilting angle α of the lift lever 22, as shown in FIG.9. As mentioned above, at step S6, the number of revolutions of the engine–SE converges on the target value, SE0 corresponding to the tilting angle α, and the loading speed Va is maintained at the target value Va0 corresponding to the detection angle θ. The controller 25 functions as the throttle opening controlling means. It also functions as the speed ratio controlling means of the present invention at step S7. That is, the first comparison unit 25b of the controller 25 outputs the deviation ε1 while comparing the vehicle speed V input from the vehicle speed detecting means 23 with the target value V0. If the vehicle speed V is greater than the target value V0 on the basis of the deviation ε1, the operation means 25e outputs the control signal S(e) for decreasing the speed ratio e to HST 4. If the vehicle speed is lower than the target value V0, 25e outputs the control signal S(e) for increasing the speed ratio e to HST 4. Thus, the pump displacement Dp and/or motor capacity Dm are changed and the vehicle speed V converges on the target value V0 at step S8. This causes the vehicle speed V to correspond to the amount of depression of the accelerator 24–ACC.

As mentioned above, the controller of the forklift relating to the first preferred embodiment of the present invention achieves the loading speed Va corresponding to the detection angle θ of the lift lever 22, thus leading to an achievement of the vehicle speed V corresponding to the amount of depression of the accelerator 24–ACC. Because of this, in the forklift having this controller, the operator controls the loading speed Va only by operating the lift lever 22, and this enables the vehicle speed V to be controlled only by operation of the accelerator 24, resulting in an excellent effect which remarkably improve the operation ability of the forklift during running while loaded, compared with the conventional forklift controller.

The specific configuration of each unit is not limited only to the above-mentioned embodiments. For example, in the above-mentioned embodiments, the elevating operation of the lift was mentioned as the loading operation, but the circumstance is quite the same also to both of the forward tilting/backward tilting operation of the mast. In this case, it is preferable that the above-mentioned lift cylinder is displaced by the tilt cylinder and the lift lever is displaced by the tilt lever.

Figure 10A:
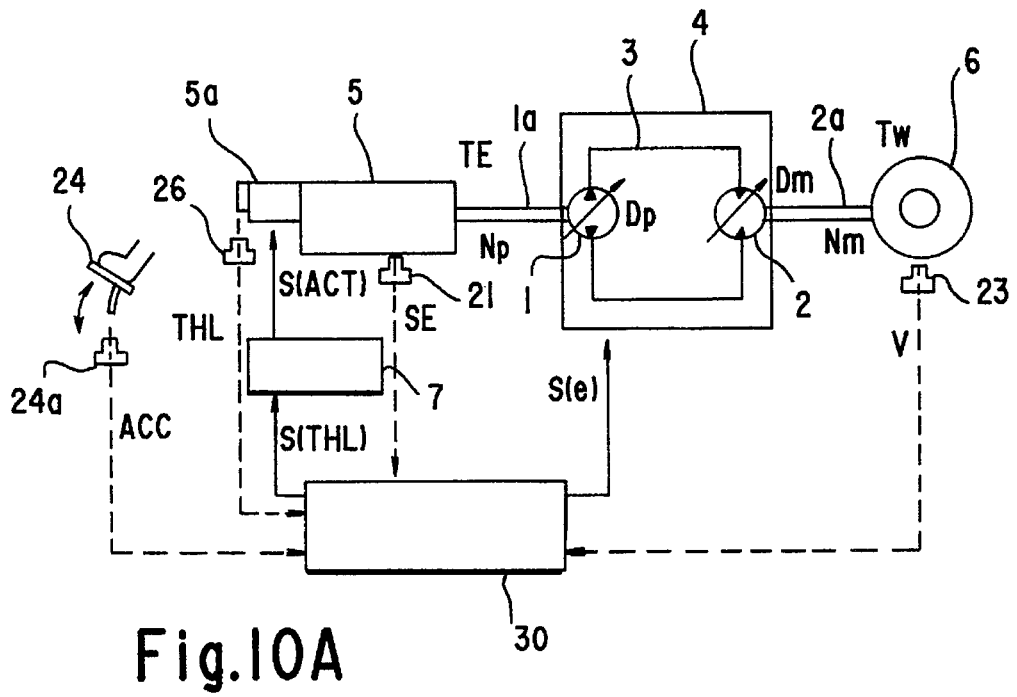
FIGS.10A–10B are conceptual drawings illustrating the configuration in the second preferred embodiment of the present invention.

FIG.10A shows the controller of the forklift according to the second preferred embodiment of the present invention. In the second preferred embodiment, the forklift performs the optimum fuel consumption control during running without the loading work. In FIG.10A, the section common to FIG.1A showing the first preferred embodiment is attached with the common codes. The loading operation means such as the fixed pump 8 and lift lever 22 are omitted. The controller of the forklift, in the second preferred embodiment of the present invention comprises a means 21 for detecting the number of revolutions of the engine, a vehicle speed detecting 23 for detecting the vehicle speed and a throttle opening detecting means 26 and a controller 30 which sets the target number of revolutions of the engine meeting the optimum fuel consumption conditions to the throttle opening detected by the throttle opening detecting means 26 and controls throttle opening of said engine so that the number of revolutions of the engine detected by the number of revolutions of the engine detecting means is maintained at the target number of revolutions of the engine. Additionally, the controller 30 controls the speed ratio of the hydrodynamic transmission so that the vehicle speed detected by the vehicle speed detecting means 23 is maintained at the target value provided by the accelerator 24.

The operation of HST 4 shown in FIGS. 2 and 3 described in the first preferred embodiment of the present invention is the same as that of HST 4 shown in the second preferred embodiment of the present invention. The throttle opening detecting means 26 is, for example, the potentiometer mounted in addition to the throttle valve driving shaft or throttle valve controlling actuator 5a. It converts the throttle opening THL into an electric signal and then outputs it.

Figure 11:
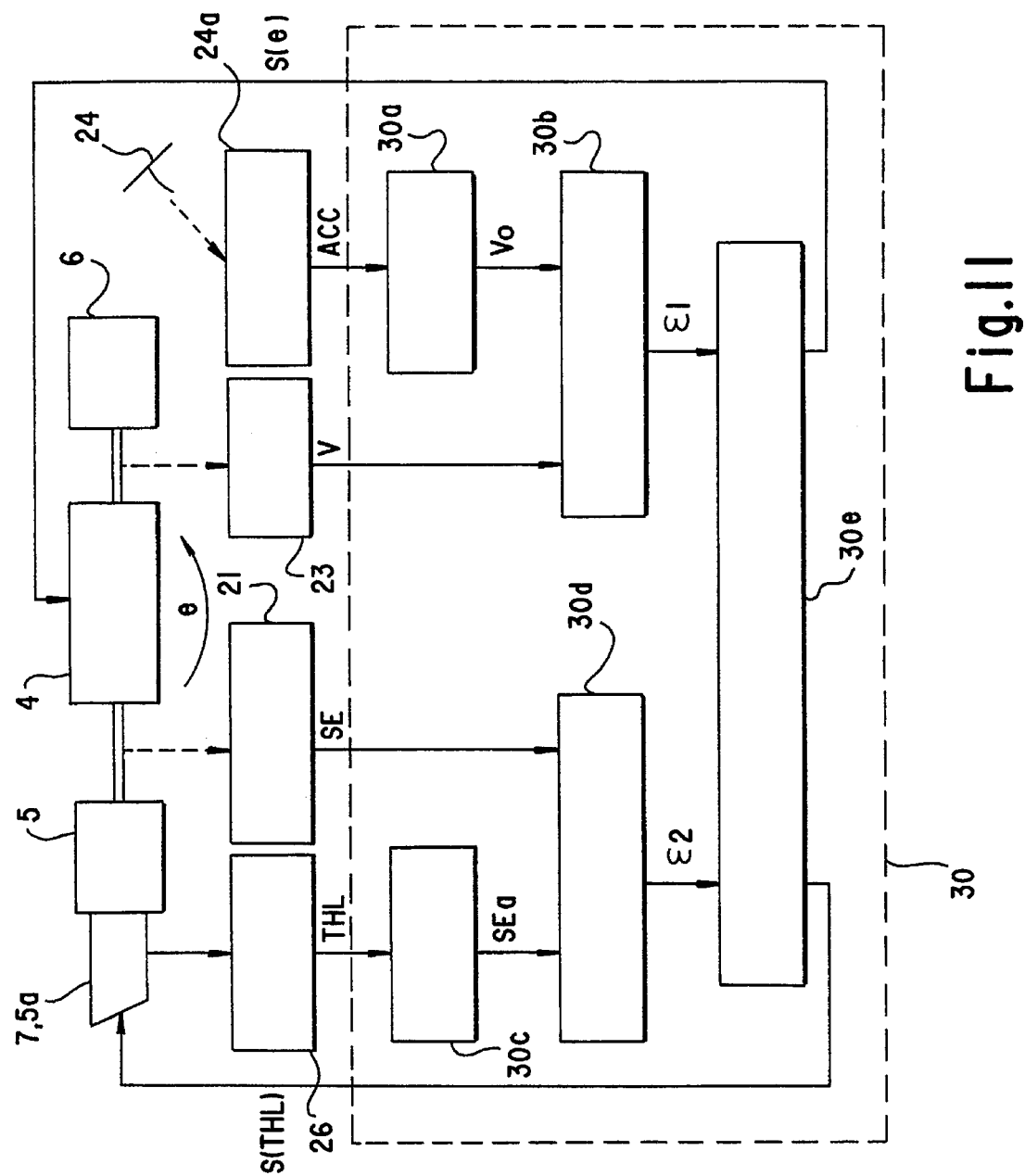
FIG.11 is a configurational explanatory drawing in the second preferred embodiment of the present invention.

The controller 30, for example, comprises an ordinary microcomputer system equipped with a CPU, memory, interface, etc. FIG.11 is a block diagram of the second embodiment of the present invention, and the section enclosed with dotted lines is a block diagram of the function of the controller 30. As shown in FIG.11, 30a is the vehicle speed determining means having the MAP1 wherein the target value V0 considered optimum to the amount of depression of the accelerator–ACC from the standpoint of the operational ability, etc. has been determined. 30c is the means for determining the number of revolutions of the engine having the MAP2 wherein the target number of revolutions of the engine–SE0 meeting the optimum fuel consumption conditions to the throttle opening THL has been determined. Specifically, in the MPA1, for example, the setting allowing an approximately linear correspondence of the amount of depression of the accelerator–ACC and target value V0 of the vehicle speed has been made. In MAP2, the optimum fuel consumption curve, illustrated in FIG. 14, has been stored. That is, as clarified from the SE-TE curve in FIG. 14, if the throttle opening THL is determined, the number of revolutions of the engine–SE and the engine output torque TE are positioned at some peculiar point on the curve. On this curve, the number of revolutions of the engine–SE meeting the optimum fuel consumption conditions to the throttle opening exists only at one (1) point, and putting the points in a row over the throttle opening THL forms the optimum fuel consumption curve. 30b is the first comparison unit which outputs the deviation $\epsilon 1$ while comparing the actual vehicle speed V with the target value V0 of the vehicle speed. 30d is the secondary comparison unit which outputs the deviation $\epsilon 2$ while comparing the actual number of revolutions of the engine–SE with the target number of revolutions of the engine–SE0. 30e is the operation means, being equipped with the control function $H_1$ based on any of the PI control, PD control, PID control, etc. which are used for converting the deviation $\epsilon 1$ into the speed ratio control signal S(e) and outputting it, and similar control function H4 for converting the deviation $\epsilon 2$ into the throttle control signal S(THL) and outputting it. 30e controls HST 4 so that the deviation $\epsilon 1$ becomes zero(0), and controls the throttle so that the deviation $\epsilon 2$ becomes zero(0).

Figure 12:
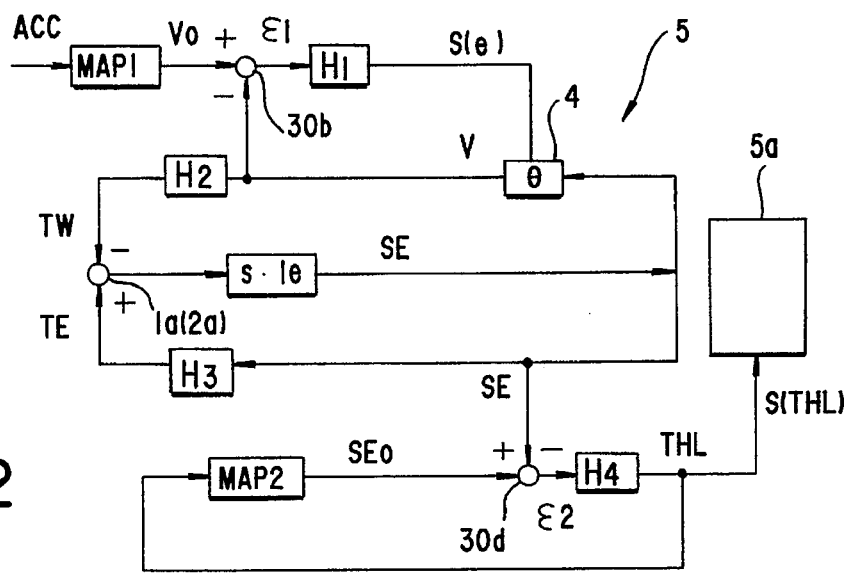
FIG.12 is a block diagram illustrating the control outline in the second preferred embodiment of the present invention.

The following are the description of the outline of the control program executed by the controller 30, together with the operation of the machine system, with reference to FIG. 10A, and FIG.12 illustrating the outline of the control means.

Figure 13:
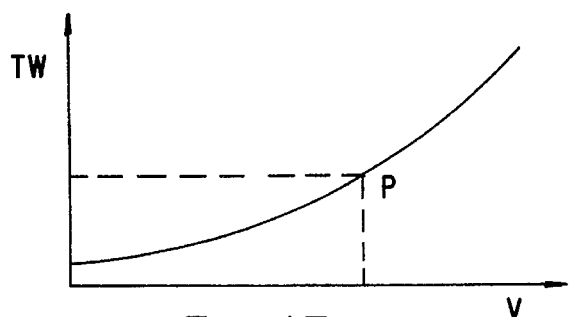
FIG.13 is a graph illustrating the relationship between the vehicle speed, V, and load torque, TW, in the second embodiment of the present invention.
Figure 14:
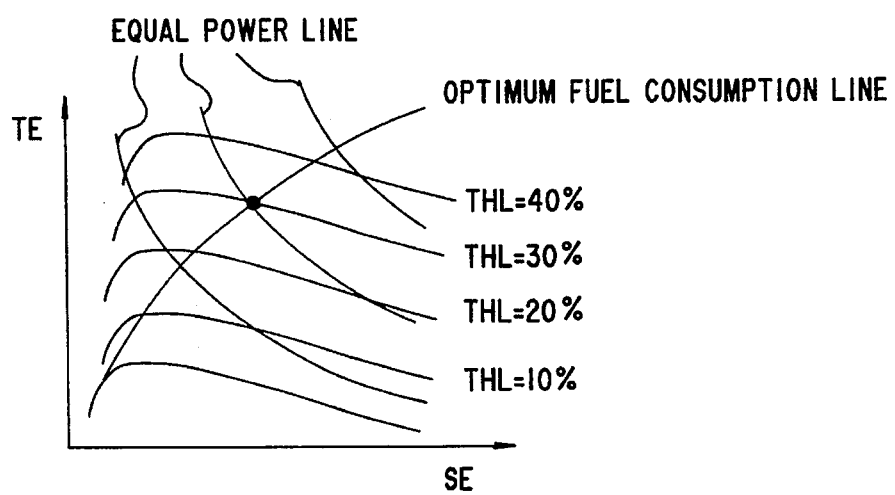
FIG.14 is a drawing describing the optimum fuel consumption line stored in MAP 2 in the second preferred embodiment of the present invention.

Initially the description of the operational characteristics of the machine system is:

(Sequence 1) In FIG.10A, when the system is normal, the engine 5 rotates at a constant number of revolutions under a constant throttle opening THL, and HST 4 converts the number of revolutions–SE into the vehicle speed V of the wheel 6 at the constant speed ratio e. The vehicle speed V is also constant and the load torque TW having a degree corresponding to the vehicle speed V is added to the engine 5. H2 shown in FIG. 12 is the transfer function between the vehicle speed V and the load torque TW, showing the peculiar characteristics per mechanism, as shown in FIG.13. As shown in FIG. 14, the engine output torque TE is collectively fixed to the throttle opening THL and number of revolutions of the engine–SE. In this case, the engine output torque TE is also constant. As the load torque TW and engine output torque TE are balanced on the shafts 1a(/2a), the aforementioned number of revolutions of the engine–SE is maintained invariably.

(Sequence 2-A) Next in FIG.10A, when considering that the speed ratio e is increased from the normal conditions, the vehicle speed V rises, resulting in an increase in the load torque TW. Due to this, the load torque TW becomes the engine output torque TE on the axel shafts 1a(/2a) and the number of revolutions of the engine–SE lessens via the inertia which the engine 5 possesses.

(Sequence 2-B) Conversely, when the speed ratio e is lessened from the ordinary conditions, the vehicle speed V de-creases, resulting in a decrease of the load torque TW. Due to this, the load torque TW becomes lower than the engine output torque TE on the axel shafts 1a(/2a) and the number of revolutions of the engine–SE rises.

(Sequence 3-A) Additionally, when considering that the throttle opening THL is increased from the normal conditions, the engine output torque TE increases. Due to this, the engine output torque TE exceeds the load torque TW on the axel shafts 1a(/2a) and the inertia which the engine 5 possesses increases the number of revolutions of the engine –SE and also raises the vehicle speed V.

(Sequence 3-B) Conversely, when the throttle opening THL is lessened from the ordinary conditions, the engine output torque TE decreases. Due to this, the engine output torque TE becomes lower than the load output torque TW on the axel shafts 1a(/2a), the number of revolutions of the engine–SE lessens and the vehicle speed V also lessens.

Next, the following are the description of the control operation of the second preferred embodiment of the present invention, on the basis of FIG.12. Initially when the machine system is put in the aforementioned normal conditions (sequence 1), the control system converges. That is, the actual vehicle speed V coincides with the target value V0 of the vehicle speed read out of MAP1, corresponding to the accelerator opening ACC. When the deviation $\epsilon 1$ is zero(0), the speed ratio signal S(e) is not output to HST 4, and HST 4 maintains the speed ratio e at that time. The number of revolutions of the engine–SE coincides with the target number of revolutions of the engine–SE0 read out of MAP2, corresponding to the throttle opening THL. When the deviation $\epsilon 2$ is zero(0), the throttle control signal S(THL) is not output to the throttle control actuator 5a, and the throttle opening THL maintains the opening THL at that time.

When the operator presses on the accelerator pedal 24, the amount of depression of the accelerator–ACC increases. The greater target value V0 of the vehicle speed is read out of MAP1, and the + deviation $\epsilon_1$ is output from the first comparison unit 30b. This allows the speed ratio increase signal S(e) to be output and then be input to HST 4 via the control function H1. It results in the machine system generating the above-mentioned status change in the sequence 2-A. That is, the vehicle speed V rises and the number of revolutions of the engine–SE lessens. As the vehicle speed V is successively being fed back to the first comparison unit 30b, the vehicle speed V gradually comes nearer to the target value V0, the deviation $\epsilon$ reduces and the control speed of the speed ratio e gets blunt. On the other hand, if this control lessens the number of revolutions of the engine–SE, the + deviation $\epsilon 2$ is output also from the secondary comparison unit 30d, and the throttle opening increase signal S(THL) is output via the control function H4. This causes the machine system to cause the above-mentioned status change in the sequence 3-A. That is, the number of revolutions of the engine–SE increases and the vehicle speed V also increases. As the throttle opening THL has been converted successively into the target number of revolutions of the engine–SE0 via MAP2, and the target number of revolutions of the engine–SE0 is being fed back to the second comparison unit 30d, the number of revolutions of the engine–SE0 gradually comes closer to the target value SE0 to the throttle opening THL, the deviation $\epsilon 2$ is reduced and the control speed of the throttle opening THL gets blunt.

Actually the status changes of the above-mentioned machine system in the sequences 2-A and 3-A occur together to the amount of depression of the accelerator–ACC and the vehicle speed V comes closer to the target value V0 corresponding to the amount of depression of the accelerator ACC. Then the number of revolutions of the engine–SE comes closer to the target value THL0 meeting the optimum fuel consumption conditions to the throttle opening THL, and as a whole, the system converges on the normal status in the sequence 1. At that time, if the vehicle speed V is excessively greater in the sequence 3-A, this time, the deviation $\epsilon_1$ output by the first comparison 30b becomes minus(–), and so the speed ratio decrease signal S(e) is output. The machine system causes the status changes of the sequences 2-B→3-B and proceeds toward the normal status. That is, in the above-mentioned control, while the status changes of the sequences 2-A and 3-B are occurring together, it finally converges on the normal status in the sequence 1.

Though the description is omitted, decreasing the amount of depression of the accelerator–ACC also leads to a control conforming with the above-mentioned control. Initially the status changes of the machine system in the sequences 2-B and 3-B occur together and in some cases, the status changes in the sequences 2-A and 3-A follow. Finally the vehicle speed V comes closer to the target value V0 corresponding to the amount of depression on the accelerator –ACC, the number of revolutions of the engine–SE comes closer to the target value THL0 meeting the optimum fuel consumption conditions to the throttle opening THL and also as a whole, the system converges on the normal status in the sequence 1.

Therefore, application of the controller of the present embodiment enables the forklift not only to run at the desirable speed, but also to control the relationship between the number of revolutions of the engine and the throttle opening so that it meets the optimum fuel consumption conditions, and improves the fuel consumption securely, compared with the conventional forklift controller.

Figure 15:
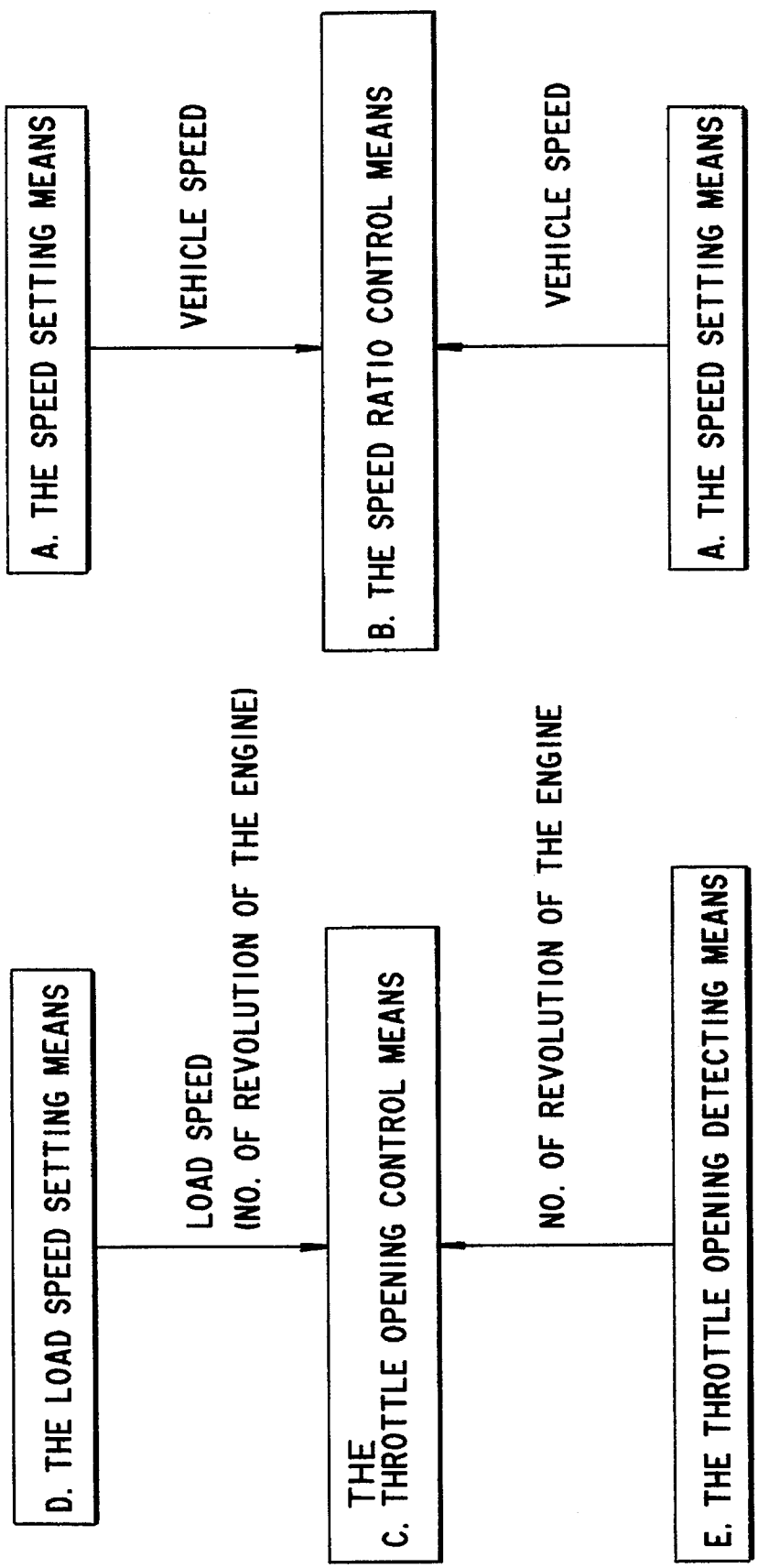
FIG.15 is a drawing describing the relationship between the invention of first embodiment and that of second embodiment.

FIG.15 shows the relationship between the invention of the above-mentioned first preferred embodiment of the present invention and that of the above-mentioned second preferred embodiment thereof. That is, both inventions have the common points that the speed ratio of HST is controlled by the speed ratio control means B so that the vehicle speed set by the speed setting means A can be obtained, and the throttle opening is controlled by the throttle opening control means C so that the prescribed number of revolutions of the engine can be obtained. Both inventions differ in that according to the invention of the first embodiment the number of revolutions of the engine is determined so that the desirable load speed set by the load speed setting means D can be obtained, and according to the invention of the second embodiment, the number of revolutions of the engine is determined to the throttle opening detected by the throttle opening detecting means E so that the optimum fuel consumption can be obtained during running without loading operation.

Figure 16:
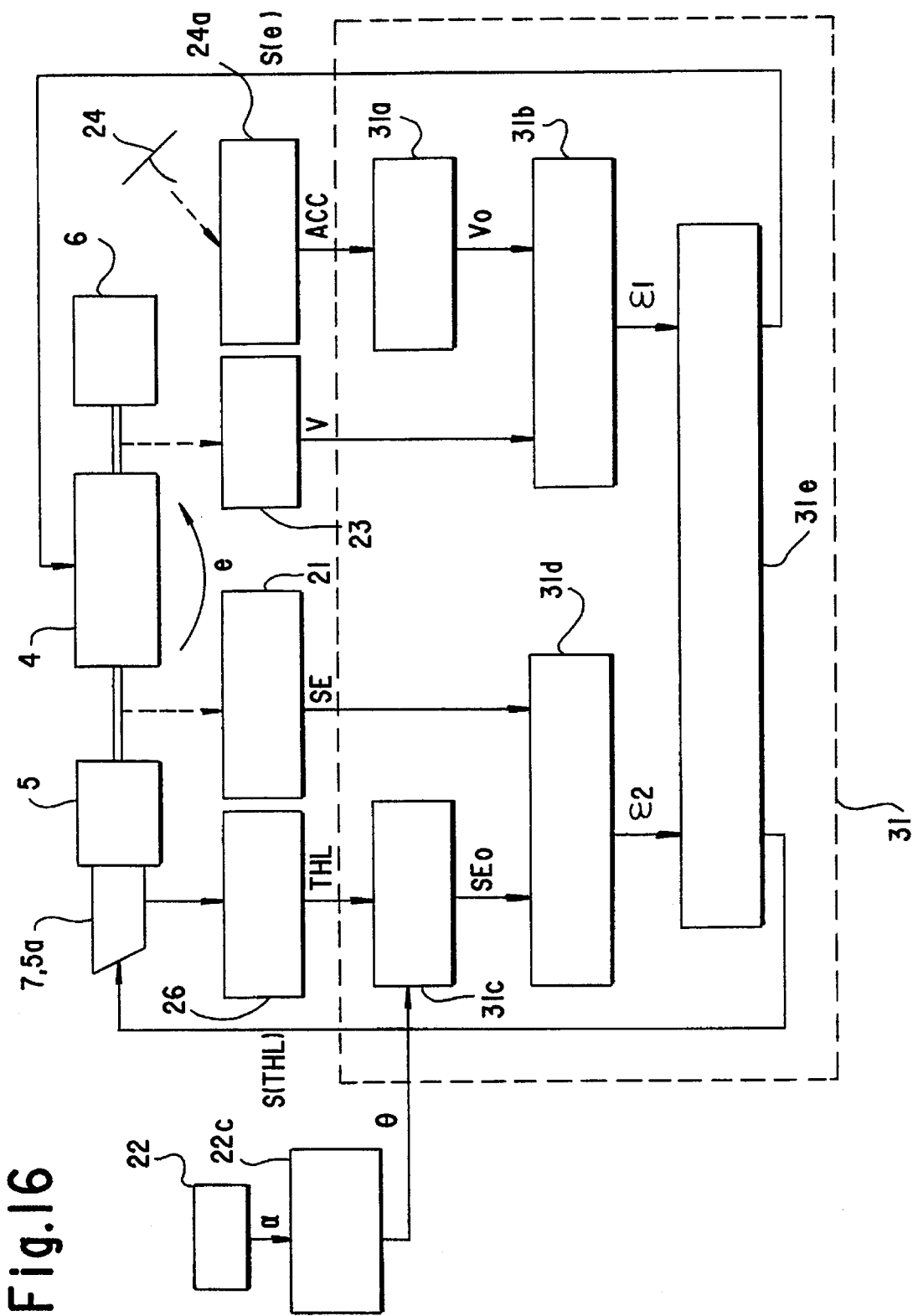
FIG.16 is a configuration explanatory drawing illustrating another embodiment wherein the first embodiment of the present invention and the second embodiment are together applied.

FIG.16 shows the favorable embodiment for combined execution of the invention of the first embodiment and that of the second embodiment. Both outputs the detection angle θ of the lift lever 22 detected by the angle detecting means 22c shown in FIG.5, and the throttle opening THL detected by the throttle opening detecting means 26 shown in FIG.11 are input into the means 31c for determining the number of revolutions of the engine. When a loading operation is done, the number of revolutions of the engine is determined so that the desirable loading speed can be obtained, according to the detection angle θ of the lift lever 22 output from the angle detecting means 22c. When a loading operation is not done, the number of revolutions of the engine to the throttle opening is determined so that the optimum fuel consumption can be obtained during running. Then the determined number of revolutions of the engine is output as the target number of revolutions of the engine–SE0 to the secondary comparison unit 31d. The same operation as shown in the first embodiment or second embodiment is conducted.

Figure 17:
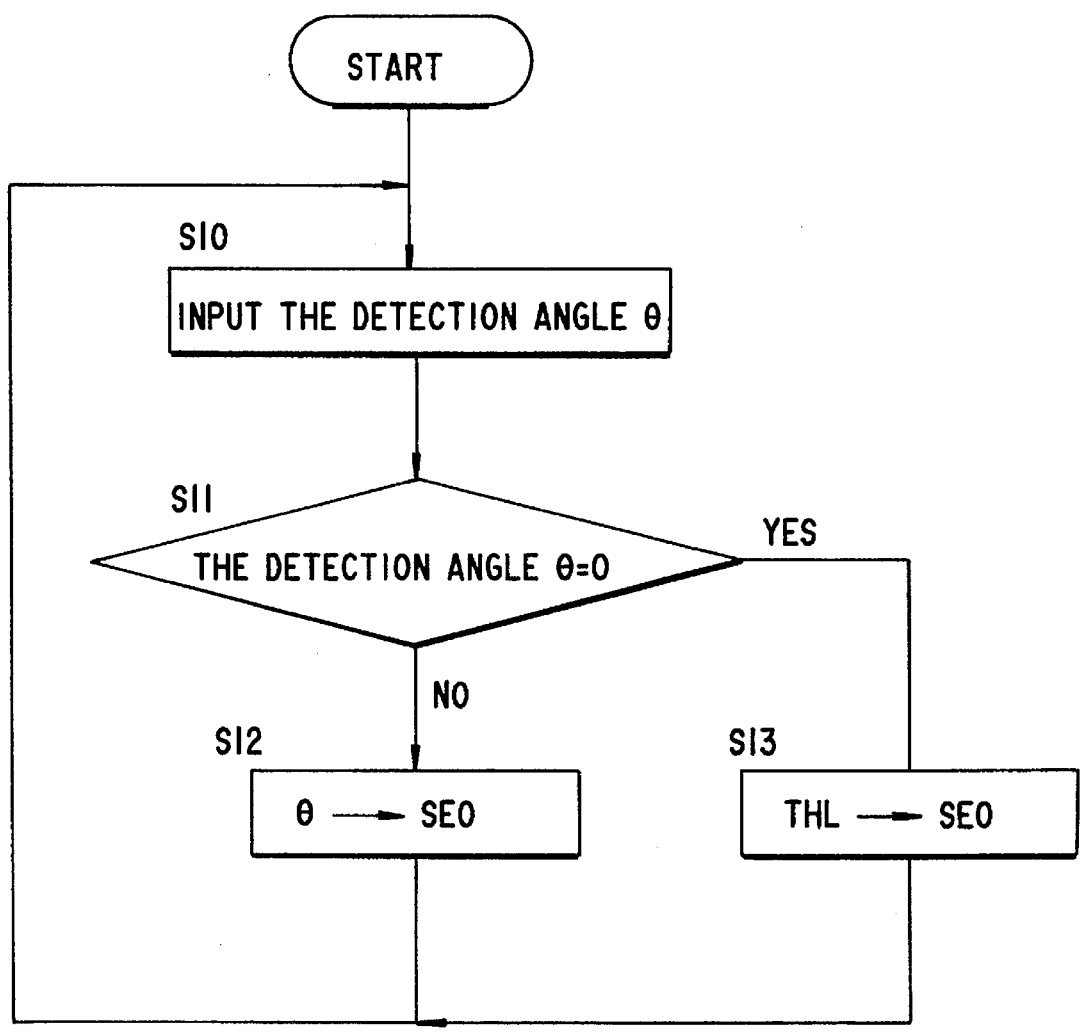
FIG.17 is a flow chart illustrating the control outline executed by the device for determining the number of revolutions of the engine in FIG.16.

FIG.17 is a flow chart illustrating the operation of the number of revolutions of the engine determining means 31c. Initially the detection angle θ of the lift lever 22 is input from the angle detecting means 22c (sequence S11) and whether the detection angle θ is zero(0) or not is determined to be (sequence S11). If the detection angle θ is not determined to be zero(0), the loading operation is determined to be being conducted, and the number of revolutions of the engine is determined so that the desirable loading speed can be obtained according to the detection angle θ of the lift lever 22. Then it is output as the target number of revolutions of the engine–SE0 to the secondary comparison unit 31d (sequence S12). With this mode, the same operation as shown in the above-mentioned first embodiment of the present invention is conducted. On the other hand, if the detection angle θ of the lift lever 22 is determined to be zero(0), the throttle opening THL is input from the throttle opening detecting means 26 and the number of revolutions of the engine enabling obtaining of the optimum fuel consumption to its throttle opening THL is determined. Then it is output as the target number of revolutions of the engine–SEO to the second comparison unit 31d (sequence S13). With this mode, the same operation as shown in the above-mentioned second embodiment is conducted.

Figure 1B:
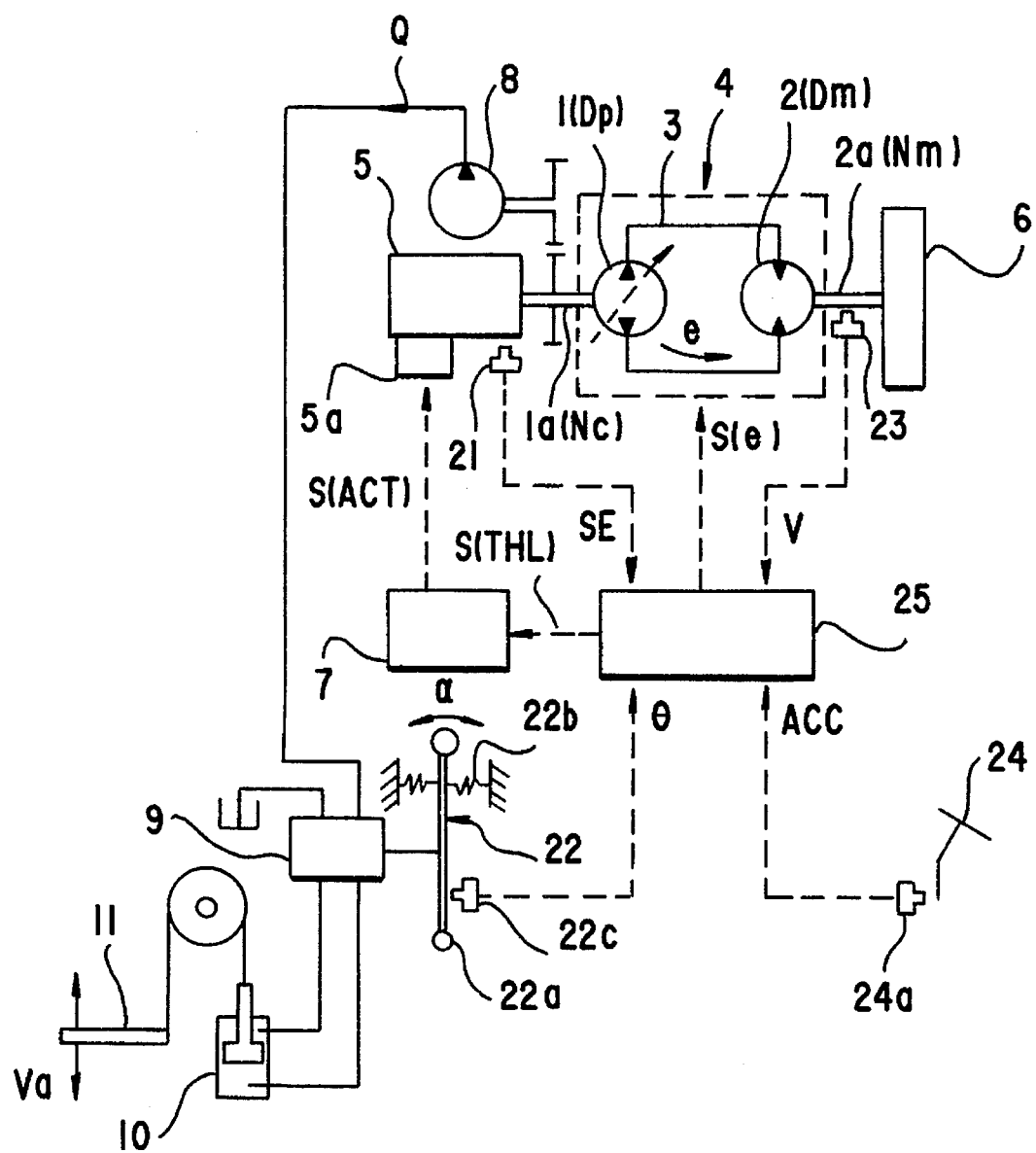
Figure 10B:
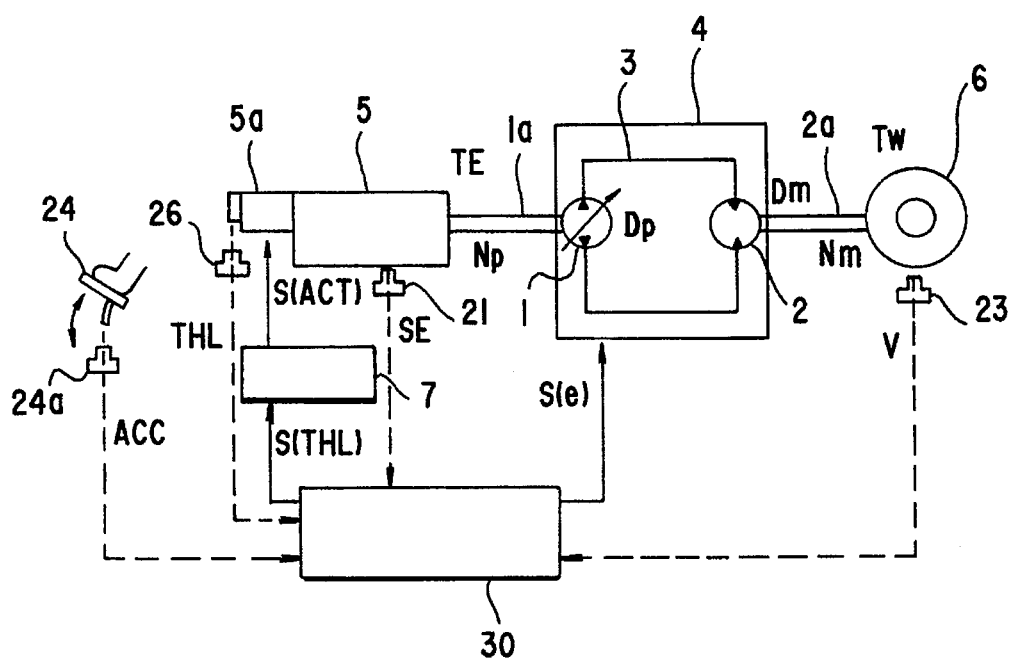

In the above-mentioned embodiment, the pump side is of a variable displacement type, and the motor side is of a variable capacity type. However, the fixed capacity type of motor 2a is also permissible for simplification as shown in FIGS. 1B and 10B. In this case, only the pump capacity changes, resulting in the speed ratio e only changes in the range of 0≦e≦1. However, if a high speed of the forklift is not required, the change of the speed ratio e out of the range becomes effective. In addition, in this embodiment, the number of revolutions of the engine is mentioned instead of the loading speed, but the loading speed can also be detected directly.

As described above, according to the first embodiment of the present invention, if the controller is applied to the forklift to control the loading speed to the target value corresponding to the operational amount of the lift lever, and to control the vehicle speed to the target value corresponding to the amount of depression of the accelerator, the operator can control the loading speed only by the lift lever and control the vehicle speed only by the accelerator, resulting in excellent effect enabling remarkable improvement of the operation ability of the forklift during loading-running can be achieved, compared with the conventional forklift controller.

According to the second embodiment of the present invention, the accelerator is separated from the throttle valve, and not only the speed ratio, but also the throttle opening are handled as the optional control parameter. This enables simultaneous execution of the optimum vehicle control corresponding to the accelerator opening and the number of revolutions of the engine control meeting the optimum fuel consumption, resulting in the remarkable effect that not only the speed operation ability of the forklift can be improved, but also running at the low fuel consumption rate can be securely conducted, compared with the conventional forklift controller.

From the foregoing description of the preferred embodiment of the invention, it will be apparent that many modifications may be made therein. It should be understood that these embodiments are intended as one example of the invention only, and that the invention is not limited thereto. Therefore, it should be understood that the appended claims are intended to cover all modifications that fall within the true spirit and scope of the invention.

What is claimed is:

1. A forklift controller for controlling a loading speed and a vehicle speed of the forklift, comprising:

a hydrodynamic transmission for changing the speed ratio infinitely while intervening between an engine and a wheel;

a loading operational means for loading operation at a loading speed corresponding to a number of revolutions of said engine, said engine being driven by engine power;

a loading speed detecting means for detecting said loading speed;

a loading speed setting means for setting a target value of said loading speed;

a vehicle speed detecting means for detecting a vehicle speed of said forklift;

a vehicle speed setting means for setting a target value of said vehicle speed;

a throttle opening controlling means, receiving said target value of said loading speed from said load speed setting means and receiving said loading speed from said load speed detecting means, for controlling the throttle opening of said engine so that said loading speed detected by said loading speed detecting means is maintained at said target value set by said loading speed setting means; and a speed ratio controlling means for controlling a speed ratio of said hydrodynamic transmission so that said vehicle speed, detected by said vehicle speed detecting means, is maintained at said target value set by said vehicle speed setting means.

2. A forklift controller of claim 1, wherein said loading operating means comprises a fixed pump which is driven by said engine power of said engine, and an actuator which is driven by said fixed pump and elevates a lift of said forklift.

3. A forklift controller of claim 2, further comprising a directional control valve for changing-over driving direction of said actuator and said directional control valve is mounted between said fixed pump and said actuator, said directional control valve being changed-over by said loading speed setting means.

4. A forklift controller of claim 2, wherein a means for detecting said number of revolutions of the engine is applied as said loading speed detecting means.

5. A forklift controller of claim 1, wherein said loading speed setting means comprises a lift lever mounted around a prescribed rotary supporting point so as to tilt freely, an angle detecting means for detecting a tilting angle of said lift lever and a means for determining said number of revolutions of the engine corresponding to a prescribed loading speed corresponding to said tilting angle of said lift lever detected by said angle detecting means.

6. A forklift controller of claim 5, wherein a dead zone is defined in a vicinity of a neutral position of said lift lever, and said tilting angle of said lift lever exceeding said dead zone is detected by said angle detecting means.

7. A forklift controller of claim 1, wherein said vehicle speed setting means comprises an accelerator nonconnected to said engine throttle, an accelerator depression detecting means for detecting an amount of depression of said accelerator, and a means for determining said target value of the vehicle speed corresponding to said amount of depression detected by said accelerator depression detecting means.

8. A forklift controller of claim 1, wherein said hydrodynamic transmission has a fixed capacity type of motor.

9. A forklift controller of claim 1, wherein said hydrodynamic transmission has a variable capacity type of motor and a variable displacement type of pump.

10. A forklift controller for controlling a loading speed and a vehicle speed of a forklift, comprising:

a hydrodynamic transmission for changing a speed ratio infinitely while intervening between an engine and a wheel;

a vehicle speed detecting means for detecting a vehicle speed of said forklift;

a vehicle speed setting means for setting a target value of said vehicle speed;

a number of revolutions of an engine detecting means for detecting a number of revolutions of said engine;

a throttle opening detecting means for detecting a throttle opening of said engine;

a number of revolutions of an engine setting means for setting a target number of revolutions of said engine meeting optimum fuel consumption conditions to said throttle opening detected by said throttle opening detecting means;

a throttle opening controlling means, receiving said target number of revolutions of said engine from said number of revolutions of said engine setting means and receiving said number of revolutions of said engine from said number of revolutions of said engine detecting means, for controlling said throttle opening of said engine so that said number of revolutions of said engine detected by said number of revolutions of said engine detecting means is maintained at said target value set by said number of revolutions of the engine setting means; and a speed ratio controlling means for controlling a speed ratio of said hydrodynamic transmission so that said vehicle speed, detected by said vehicle speed detecting means, is maintained at said target value set by said vehicle speed setting means.

11. A forklift controller of claim 10, wherein said vehicle speed setting means comprises an accelerator nonconnected to the throttle of said engine, an accelerator depression detecting means for detecting an amount of depression of the accelerator and a means for determining said target value of said vehicle speed corresponding to said amount of depression of the accelerator detected by said accelerator depression detecting means.

12. A forklift controller of claim 10, wherein said hydrodynamic transmission has a fixed capacity type of motor.

13. A forklift controller of claim 10, wherein said hydrodynamic transmission has a variable capacity type of motor and a variable displacement type of pump.

* * * * *